3,548,052
HEPARIN COMPOSITIONS AND METHODS OF
USING SAME
Teow Yan Koh, Toronto, Ontario, Canada, assignor to
Canada Packers Limited, Toronto, Ontario, Canada
No Drawing. Continuation-in-part of applications Ser. No.
502,532, Oct. 22, 1965, and Ser. No. 550,935, May 18,
1966, which in turn are, respectively, a continuation-
in-part of application Ser. No. 406,916, Oct. 27, 1964,
and Ser. No. 457,502, May 20, 1965. This application
Jan. 18, 1968, Ser. No. 698,695
Int. Cl. A61j 3/07; A61k 17/18, 27/12
U.S. Cl. 424—16                                    8 Claims

ABSTRACT OF THE DISCLOSURE

This invention relates to intra-intestinally active heparin and to methods for formulating and administering heparin so that it is an effective anticoagulant by the intestinal route. The compositions contain at least one non-toxic physiologically acceptable dialkyl sulfoxide, preferably one which in combination with the heparin may be readily encapsulated. Representative examples are di-n-propyl sulfoxide and di-n-butyl sulfoxide. It has been discovered that the alkyl sulfoxides promote the absorption of the anticoagulant substance through the mucous membranes of mammalian animals. The compositions may also contain a fatty alcohol of chain length $C_{14}$ to $C_{24}$ to prolong or regulate the time period of absorption of the active anticoagulant substance from the composition. The composition may be administered in the form of solids or liquids which may be incorporated in enteric-coated tablets or capsules.

---

The present application is a continuation-in-part of my copending applications Ser. No. 502,532 filed Oct. 22, 1965, now abandoned, and Ser. No. 550,935 filed May 18, 1966, now abandoned, which, in turn, are, respectively, a continuation-in-part of Ser. No. 406,916 filed Oct. 27, 1964, now abandoned, and of Ser. No. 457,502 filed May 20, 1965, now abandoned.

BACKGROUND AND DEFINITIONS

The word "heparin" as used in the art and in the present application refers to the natural sulfated polysaccharides composed of alternating hexosamine and hexuronic residues and to the non-toxic salts thereof.

Heparin has a long established reputation as a safe and effective anticoagulant and/or antilipemic agent. Its use, however, has been limited by the need to administer it parenterally, since it is inactive or only slightly active per se when introduced into the gastro-intestinal tract. Injections have been characterized by a quick response to provide a high level of systemic anticoagulant activity which then declines at a rapid rate. Therefore, repeated intravenous injections or large subcutaneous injections are required where it is desired to maintain a therapeutic level of anticoagulant activity in the blood. Such repeated injections are both inconvenient and painful.

THE INVENTION

The invention in its broad aspect resides in the discovery that certain dialkyl sulfoxides enhance or promote the absorption of heparin through the mucous membranes, such as the walls of the intestinal tract. By combining heparin with a sufficient amount of a non-toxic, pharmaceutically acceptable dialkyl sulfoxide effective to promote the absorption of the anticoagulant substance through the mucous membranes, the use of these highly regarded anticoagulant substances is extended to intra-intestinal administration.

Use of the invention is in the fields for which heparin therapy has already been established and may be in the veterinary field for the therapeutic treatment of animals.

The invention, in a further aspect, resides in the discovery that certain saturated and unsaturated fatty alcohols and mixtures thereof, preferably of chain length $C_{14}$ to $C_{24}$, when administered simultaneously with heparin and a dialkyl sulfoxide, improve and sustain the effectiveness of the anticoagulant activity. This represents a substantial advantage in anticoagulant therapy, where a sustained action is very desirable. Repeat dosages may be administered at longer time intervals and a more uniform response attained.

An object is to provide an improved heparin composition from which the anticoagulant activity is absorbable into the blood stream from the intestinal tract.

Another object of the invention is to provide a heparin composition from which the anticoagulant activity is absorbable from the intestinal tract over a sustained period of time.

A still further object of the invention is the provision of intra-intestinally effective heparin compositions which are easy to encapsulate.

Dialkyl sulfoxides which will promote the absorption of heparin through the walls of the mucous membranes, such as the walls of the intestine, are dimethyl sulfoxide (DMSO) and its homologues wherein the alkyl groups each contain up to twelve carbon atoms. However, DMSO is difficult to encapsulate and administration of combinations of DMSO with heparin may have to be by direct injection into the intestinal tract as by stomach tube or the like. Once in contact with the intestinal walls the heparin activity is readily absorbed from the composition. DMSO, however, has a further side effect in that its use gives rise to a characteristic garlic smell on the breath of the host to which it is administered. Surprisingly, the homologues of DMSO, and particularly di-n-propyl sulfoxide and di-n-butyl sulfoxide, can be readily encapsulated, do not give rise to any objectionable smell on the breath and are substantially as effective as DMSO in promoting the absorption of heparin through the walls of the mucous membranes. Therefore, the homologues of DMSO are the preferred dialkyl sulfoxides for purposes of the present invention and their use is contemplated where an encapsulated composition for intra-intestinal administration is prepared.

The fatty alcohols of chain length $C_{14}$ to $C_{24}$ are exemplified by cetyl alcohol ($C_{16}$), stearyl alcohol ($C_{18}$), oleyl alcohol ($C_{18}$), arachidyl alcohol ($C_{20}$), behenyl alcohol ($C_{22}$) and mixtures thereof which are obtainable, for example, by reduction of corresponding fatty acids. The fatty acids themselves are ineffective. The fatty alcohols of the chain length specified may be either saturated or unsaturated, e.g. oleyl alcohol. They possess good emulsifying properties. Further, it has been found that in general, the longer the chain length of the fatty alcohol, the better the degree of enhancement of the heparin composition with respect to sustained time of absorption of the anticoagulant activity.

The mechanism of the action of the alkyl sulfoxides is unknown, but it is thought that they affect the porosity of the intestinal mucosa thereby permitting the absorption of the heparin. It is apparent that the absorption of heparin from the composition does not depend upon solubility characteristics either of the heparin in the enhancing agent or of the enhancing agent in water. Heparin sodium, the commercial form of heparin, is very soluble in water but cannot be absorbed from water solutions through the intestinal walls.

The composition may be in the form of a solution or suspension or solid admixture of the ingredients depending upon the solubility and melting characteristics of the selected alkyl sulfoxide. The presence of water is not critical and may be added if desired for convenience. It is primarily used as a diluent, as a dispersing medium, and to control dosages. In general, the amount of alkyl sulfoxide present in the composition is the minimum that will provide the desired absorption-enhancing effect upon the selected heparin. Where a $C_{14}$ to $C_{24}$ fatty alcohol is used in addition to the alkyl sulfoxide, the amount is usually at least equal on a weight basis to the heparin or heparinoid component. Functionally, it may be expressed as that amount which will enhance and/or prolong the anticoagulant absorption from the heparin alkyl sulfoxide compositions.

The composition may be compounded in a number of ways. The two or three components, as the case may be, may be simply mixed together with or without the addition of water. A convenient preparation, where the fatty alcohol is used, is in the form of an emulsion. Thus, the fatty alcohol may be thoroughly dispersed in the dialkyl sulfoxide, the heparin or a water solution thereof added and the resulting material mixed until a uniform emulsion is formed.

In anticoagulant therapy, the desired therapeutic dosage is the amount of heparin which is sufficient to double blood clotting time. The therapeutic dosage for the compositions of the invention is readily determined by those skilled in the art. Sufficient of the composition is administered intra-intestinally in one or more tablets or capsules to double the blood clotting time as determined on a sample of withdrawn blood of the particular species of mammal undergoing treatment. If the therapeutic level is to be maintained the dosage is repeated at intervals as deemed necessary.

Representative therapeutic dosages may contain, for example, 50 to 100 mg. of heparin having an activity of 100 anticoagulant u./mg., and from about 0.5–10 grams of the selected dialkyl sulfoxide per 100 mg. of heparin. From 0.1 to 2 grams of fatty alcohol may be included. If water is included in the composition, the amount can vary over wide limits, e.g. from 0 to 90%.

The total daily dosage unit of heparin for a mammal, such as a dog, may, for example, be from 50–1000 mg. (based on heparin having an activity of 100 u./mg.) in combination with from 0.5 to 10 grams of the dialkyl sulfoxide and, if desired, from 0.1 to 10 grams of the fatty alcohol. Because of the well-known instability of heparin in acids, standard encapsulation procedure as set forth, for example, in Remington's Practice of Pharmacy, is used to provide a capsule which is resistant to the acid medium of the stomach and will be dissolved in the alkaline medium of the intestine. As an example of this mode of administration, the dosage unit sufficient to double blood clotting time is given in the form of one or more enteric-coated gelatin capsules. The invention is further illustrated by the following examples of practice.

EXAMPLE 1

Heparin preparations

Dosage units of 100 mg. of heparin sodium (150 u./mg.) in 1–5 ml. of a selected dialkyl sulfoxide, preferably having two or more carbon atoms in each alkyl group, with or without dilution with water, are encapsulated in gelatin and the resulting gelatin capsules are provided with an enteric coating, as by treating with shellac or the like. Similarly, further capsules are made with dosage units containing from 25 mg. up to 500 mg. of heparin and from 1–5 ml. of the selected dialkyl sulfoxide. The capsules are administered intra-intestinally in sufficient number to provide effective heparin therapy.

Likewise, capsules containing other heparin salts in lieu of sodium heparin are prepared.

Representative compositions including fatty alcohols along with the heparin compound and dialkyl sulfoxide are prepared as follows.

EXAMPLE 2

300 mg. of cetyl alcohol are ground in 3 ml. of dialkyl sulfoxide in a mortar until a homogeneous mass is produced. To this mass is added 100 mg. of heparin, or an aqueous solution of 100 mg. of heparin in e.g. 0.5 ml. of $H_2O$, and the contents are stirred until a uniform emulsion is produced.

EXAMPLE 3

200 mg. of arachidyl alcohol are ground in 3 ml. of dialkyl sulfoxide in a mortar until a homogeneous mass is produced. To this mass 100 mg. of heparin, or a solution of 100 mg. of heparin in e.g. 0.5 ml. of $H_2O$ is added and the contents are stirred until a uniform emulsion is produced.

EXAMPLE 4

A stable aqueous emulsion containing 100 mg. of heparin, 0.5 ml. of $H_2O$, 3 ml. of dialkyl sulfoxide and 300 mg. of stearyl alcohol is produced by the method of Example 2.

EXAMPLE 5

Stable aqueous emulsions containing 100 mg. of heparin, 0.5 ml. of $H_2O$, 3 ml. of dialkyl sulfoxide and 100 mg. and 200 mg. of behenyl alcohol, respectively, are produced using the method of Example 2.

Heparin compositions containing oleyl, cetyl, arachidyl, stearyl and behenyl alcohols are prepared by the procedure of Examples 2–5 using di-n-propyl sulfoxide, di-n-butyl sulfoxide or other homologues of DMSO, respectively, as the absorption enhancement agent.

Water is not necessary in these compositions and may be omitted, if desired. These compositions are encapsulated as by the procedure in Example 1.

EXAMPLE 6

Intestinal absorption of sodium heparin, di-n-butyl sulfoxide and stearyl alcohol in the dog 680 mg. sodium heparin (activity 159 U.S. anticoagulant 7/mg.) was suspended in 4.0 ml. of di-n-butyl sulfoxide and 2.0 ml. stearyl alcohol, and the material encapsulated. Anaesthesia was induced in a male dog (weight 15 kg.) by introvenous sodium pentobarbital and maintained by inhalation of ether. The abdomen was entered by a mid-line incision, the jejunum identified and its wall longitudinally slit to accommodate the insertion of capsules. The capsules were inserted singly into the jejunum and the jejunal incision closed by sutures. The jejunum was replaced in the abdominal cavity and the abdominal incision closed. Blood samples were obtained by venepuncture at intervals after insertion of the capsules and the clotting time determined. Systemic anticoagulant activity, at above therapeutic level, occurred 1¼ hours after insertion of capsules. A therapeutic range was maintained for 3 hours.

Similar results are obtained by feeding the capsules to the dog except that the time lag between feeding and the appearance of systemic anticoagulant activity in the blood, at therapeutic level, is greater in order to permit passage of the capsules through the stomach and into the intestine. This may require two to three hours.

The effect of the dialkyl sulfoxides upon the absorption of heparin is further demonstrated by experiments on test animals.

EXAMPLE 7

Heparin absorption by the intestinal loop in situ

In vivo heparin absorption by the intestinal loop in situ was determined on rabbits. Rabbits, unsegregated as to sex, weighing 2–3 kg. after overnight fasting were used. Under pentobarbital (40 mg./kg.) intravenous anaesthesia, a suitable length of the mid-gut was exposed. The loop was transected at both ends leaving mesenteric blood supply intact. The loop was irrigated with approximately 50 ml. of oxygenated saline and the distal end ligated. A dosage unit of heparin sodium (150 u./mg.) in 50% aqueous dialkyl sulfoxide was instilled into the loop and the proximal end ligated. The loop was then replaced in the abdominal cavity, care being exericsed to avoid kinking the blood vessels. Blood samples were taken by cardiac puncture at time intervals following instillation of heparin-dialkyl sulfoxide solution. The clotting time was determined by the capillary method, Mayer, G. A.: J. Lab. Clin. Med., 49: 938 (1957).

(A) Heparin-DMSO.—One hundred mg. of heparin (150 u./mg.) in 4 ml. of 50% aqueous DMSO were instilled into the intestinal loop. Within an hour anticoagulant activity appeared in the blood. This effect was unequivocal. Sufficient amounts of heparin entered the blood stream to increase the clotting time of cardiac blood, determined by the capillary method, well above the therapeutic level. The prolongation of clotting time of cardiac blood could be maintained for a period of at least 4 hours. Gross examination of the loop at the end of the experiment showed no evidence of trauma. A therapeutic dose (doubling the blood clotting time) of heparin, administered intravenously, usually maintains its effects for 1–3 hours.

Following instillation of 4 ml. of 50% aqueous DMSO without heparin, no change in the clotting time of cardiac blood was observed. It is known that heparin per se is not absorbed by the intestine. Nevertheless, control experiments in which the installate consisted of 100 mg. of heparin in water alone, were performed in order to check the experimental technique. In all cases no change in clotting time was observed. The results are set forth in Table I.

In the experiments on rabbits 4 and 5 (Table I) the loops were washed with the saline and then with 50% aqueous DMSO prior to introduction of the heparin-DMSO solution. Heparin absorption far above the therapeutic level was obtained by this mode of administration. It was found that effective anticoagulation could be obtained with lower amounts of heparin by using this technique. Thus, in another experiment, when 25 mg. of heparin was instilled with 4 ml. of 50% aqueous DMSO into the intestinal loops which had been washed with saline and 50% aqueous DMSO an approximately three-fold increase in clotting time was obtained.

(B) Heparin-di-n-propyl sulfoxide.—One hundred mg. of heparin (155 u./mg.) in 4 ml. of 50% di-n-propyl sulfoxide were introduced into the ligated rabbit jejunum. The whole blood clotting time was raised to a level exceeding 240 minutes within an hour after the introduction of the instillate. The clotting time was maintained at about 7 times above normal after 4 hours. The data are given in Table II. Di-n-propyl sulfoxide per se produced no anticoagulation.

TABLE II.—INFLUENCE OF DI-N-PROPYL SULFOXIDE ON ABSORPTION OF HEPARIN FROM SMALL INTESTINAL LOOP IN SITU

| Rabbit No. | Injecta* Heparin, mg. | Di-n-propyl sulfoxide, ml. | Hours after instillation | | | |
|---|---|---|---|---|---|---|
| | | | 0** | 1 | 3 | 4  6 |
| | | | Clotting time (min. and sec.) | | | |
| 10 | 100 | 4.0 | 8'45"±43" | 200' | [1]108' | |
| 11 | 100 | 4.0 | | 240' | [1]86' | |
| 12 | 100 | 4.0 | | [1]289' | | [1]68'  8' |
| 13 | | 4.0 | | 8'11" | 8'13" | 8'16" |

[1] Approximately.
*Heparin—155 U.S.P. anticoagulant u./mg., di-n-propyl sulfoxide, 50% aqueous solution.
**Mean and standard deviation for 20 rabbits.

EXAMPLE 8

Heparin absorption from the intact intestine

The absorption of heparin from the intact rabbit intestine through the use of the various dialkyl sulfoxides was also determined. The general procedure consisted of exposing the small intestine of anaesthesized rabbits and, without ligation or washing, injecting the aqueous dialkyl sulfoxide-heparin solution into the lumen. Blood samples were taken at time intervals after injection and the clotting time determined as before. Dimethyl sulfoxide, di-n-propyl and di-n-butyl sulfoxide were effective in providing heparin absorption from the intact intestine.

(A) Heparin-DMSO.—One hundred mg. of heparin (152 u./mg.) were injected with from 2–5 ml. of DMSO into the intact jejunum of each test rabbit. The results presented in Table III, below, show that adequate absorption and effective anticoagulation was obtained by the aqueous DMSO at a volume of 4 ml. and above, when administered with 100 mg. of heparin. With lower volumes of DMSO, a slight increase in anticoagulant activity was observed. It will be understood that the intestinal fluids have a diluting effect upon the dialkyl sulfoxide used and that the volume of selected dialkyl sulfoxide necessary TABLE I.—INFLUENCE OF 50% AQUEOUS DMSO ON ABSORPTION OF HEPARIN FROM SMALL INTESTINAL LOOP IN SITU

| Rabbit No. | Instillate | Hours after instillation | | | | | |
|---|---|---|---|---|---|---|---|
| | | 0 | 2 | 2½ | 3 | 4 | 4½  6 |
| | | Clotting time (min. and sec.) | | | | | |
| 1 | Heparin-DMSO | 7.58 | | 31.33 | | 24.01 | 28.56 |
| 2 | do | 8.03 | 14.00 | | 18.58 | | 10.06 |
| 3 | do | 7.17 | | 13.20 | | | 11.49 |
| 4 | do | 8.06 | 71.00 | | | | 23.13 |
| 5 | do | 8.02 | >90 | | >90 | | |
| 6 | DMSO | 10.31 | 8.18 | | 8.29 | 8.24 | |
| 7 | DMSO | 6.58 | | 7.15 | | 6.28 | |
| 8 | Heparin | 6.28 | 5.38 | | | | |
| 9 | do | 9.32 | 8.55 | | 9.13 | | |

NOTE:
Heparin-DMSO, 100 mg. heparin (150 u./mg.) in 4 ml. 50% aqueous DMSO.
DMSO, 4 ml. 50% aqueous DMSO.
Heparin, 100 mg. heparin (150 u./mg.) in 4 ml. water.

to produce effective promotion of absorption of the heparin for each animal system can readily be determined by one skilled in the art.

TABLE III.—ABSORPTION OF HEPARIN IN THE RABBIT INTACT INTESTINE (DMSO)

| Rabbit No. | 100 mg. Heparin* injected with DMSO, ml. | Hours after injection | | | | | | | |
|---|---|---|---|---|---|---|---|---|---|
| | | 0 | 1 | 1½ | 2 | 2½ | 3 | 3½ | 4 |
| | | Clotting time (min. and sec.) | | | | | | | |
| 14 | 2 | 8'45" | | | | 8'56" | | | 7'58" |
| 15 | 3 | 9'34" | 9'21" | 8'50" | | | 10'30" | | |
| 16 | 3 | 8'03" | | | | | 8'30" | | |
| 17 | 3 | 8'19" | | 12'42" | | | 13'10" | | 11'53" |
| 18 | 3 | 8'41" | | 7'48" | | | 12'15" | | 12'23" |
| 19 | 4 | 9'20" | 11'55" | | 18'28" | | | | |
| 20 | 4 | 9'19" | | | 28'44" | | 21'50" | | |
| 21 | 5 | 9'53" | | | 21'35" | | | 19'35" | |

*Heparin, 152 u./mg.; DMSO, 50% aqueous solution.

(B) Heparin-di-n-propyl sulfoxide.—One hundred mg. of heparin suspended in 3.0 ml. 50% di-n-propyl sulfoxide were injected into the intact jejunum of each test rabbit. The blood clotting time was doubled in an hour. The systemic anticoagulant activity then receded and returned to normal after about 3 hours. A higher proportion of n-propyl sulfoxide solution (4.0 ml. of 50% solution per 100 mg. of heparin) improved heparin absorption, which resulted in a more intense anticoagulant effect. The results are set forth in Table IV below:

The comparative effects of compositions containing only heparin and a dialkyl sulfoxide with those compositions also containing a fatty alcohol of $C_{14}$ to $C_{24}$ chain length are shown by a further series of tests recorded in the following tables. In these tests, rabbits (average weight 3 kg.) and mongrel dogs (average weight 12 kg.) of either sex were used. Anaesthesia was induced in the rabbit by inhalation of ether and in the dog by intravenous sodium pentobarbital (30 mg./kg.). The abdomen was entered by a mid-line incision and the duodenum TABLE IV.—ABSORPTION OF HEPARIN IN THE RABBIT INTACT INTESTINE (Di-n-PROPYL SULFOXIDE)

| | Heparin,* mg. | Di-n-propyl sulfoxide, ml. | Hours after injection | | | |
|---|---|---|---|---|---|---|
| | | | **0 | 1 | 2½ | 4 |
| | | | Clotting time (min. and sec.) | | | |
| Rabbit No.: | | | | | | |
| 22 | 100 | 4.0 | 8'45"±43" | 38'40" | 12'08" | <8' |
| 23 | 100 | 3.0 | | 16'40" | 11'05" | 8'10" |
| 24 | 100 | 3.0 | | 17'08" | 9'30" | <8' |

*Heparin 155 U.S.P. anticoagulant u./mg.; di-n-propyl sulfoxide, 50% aqueous solution.
**Mean and standard deviation for 20 rabbits.

(C) Heparin-di-n-butyl sulfoxide.—One hundred mg. of haparin (159 u./mg.) and 2.0 ml. 50% aqueous suspension of di-n-butyl sulfoxide were injected into the intact intestine of each test rabbit. The blood clotting time doubled in one hour. The peak systemic anticoagulant activity was reached in 2 hours. The duration of a therapeutically effective level of blood heparin (twice the normal blood clotting time) was approximately 4 hours. The results are set forth in Table V.

identified. The test solution or emulsion was injected into the duodenum. At time intervals after injection, 10 ml. blood samples were obtained from the rabbit by cardiac puncture and from the dog by venepuncture. In some instances the jejunum was used as the site of the injection. The clotting time was determined by the method of Mayer G. A., J. Lab. Clin. Med., 49, 938 (1957). The results with and without the fatty alcohols of the invention are given in Tables VI through XII below.

TABLE V.—ABSORPTION OF HEPARIN FROM THE RABBIT INTACT INTENSTINE (Di-n-BUTYL SULFOXIDE)

| | Injecta* | | Hours after injection | | | |
|---|---|---|---|---|---|---|
| | Heparin, mg. | Di-n-butyl sulfoxide, ml. | **0 | 1 | 2 | 4 |
| | | | Clotting time (min. and sec.) | | | |
| Rabbit No.: | | | | | | |
| 25 | 100 | 2.0 | 8'45"±43" | 16'32" | 22'35" | 10'00" |
| 26 | 100 | 2.0 | | | 23'28" | 12'49" |

*Heparin 159 U.S.P. anticoagulant u./mg.; n-butyl sulfoxide, 50% aqueous suspension.
**Mean and standard deviation for 20 rabbits.

TABLE VI.—SYSTEMATIC ANTICOAGULANT ACTIVITY AFTER INTRADUODENUM INJECTION OF HEPARIN AND DIMETHYL SULFOXIDE

| | Material injected | | Hours after injection | | | | | | | | | |
|---|---|---|---|---|---|---|---|---|---|---|---|---|
| | Heparin, mg. | DMSO, ml. | 0 | 1 | 1½ | 2 | 2½ | 3 | 3½ | 4 | 4½ | 5 | 5½ |
| | | | Clotting time (min. and sec.) | | | | | | | | | | |
| Rabbit No.: | | | | | | | | | | | | | |
| 1 | 100 | 3 | 8'45" | | | | 9'47" | | | 8'11" | | 8'28" | |
| 2 | 100 | 3 | 8'50" | 9'08" | | 10'03" | | | | | | 8'21" | |
| 3 | 100 | 4 | 9'20" | 11'15" | | 18'28" | | | | | | | |
| 4 | 100 | 4 | 9'19" | | | 28'44" | | 21'50" | | | | | |
| 5 | 100 | | 8'50" | 8'43" | | 8'30" | | | | 8'22" | | | 8'35" |
| 6 | | 4 | 8'30" | 8'21" | | 8'49" | | | | 8'38" | | | 8'24" |
| Dog No.: | | | | | | | | | | | | | |
| 1 | 100 | 4 | 5'24" | 10'19" | | | 14'21" | | 11'48" | | 10'37" | | 6'09" |
| 2 | 100 | 4 | 5'36" | 15'24" | | | 16'19" | | | | 9'40" | | 3'45" |
| 3 | 100 | | 5'01" | 5'17" | | | 4'20" | | 5'05" | | 5'57" | | |
| 4 | | 4 | 4'45" | 3'20" | | 4'30" | | 4'25" | | 4'50" | | 4'15" | |

NOTE.—Heparin: 151 U.S.P. anticoagulant units/mg.

TABLE VII.—SYSTEMIC ANTICOAGULANT ACTIVITY AFTER INTRADUODENUM INJECTION OF HEPARIN, DIMETHYL SULFOXIDE, AND CETYL ALCOHOL

| | Material injected | | | Hours after injection | | | | | | | | |
|---|---|---|---|---|---|---|---|---|---|---|---|---|
| | Heparin, mg. | DMSO, ml. | Cetyl alcohol, mg. | *0 | 2 | 5 | 16 | 17 | 21 | 22 | 25-30 | 40-50 |
| | | | | Clotting time (min. and sec.) | | | | | | | | |
| Rabbit No.: | | | | | | | | | | | | |
| 7 | 100 | 3 | 300 | 8'43"±43" | 9'44" | 8'58" | | | | 11'56" | 9'59" | |
| 8 | 100 | 3 | 300 | 8'43"±43" | | | 12'50" | | 12'03" | | | 8'30" |
| 9 | 100 | 3 | 300 | 8'43"±43" | | | 11'10" | | 10'56" | | | |
| 10 | | 3 | 300 | 8'43"±43" | 9'31" | 9'10" | | | | 9'25" | 9'10" | |
| 11 | | 3 | 300 | 8'43"±43" | | | 8'16" | | | 8'30" | | |
| 12 | 100 | | 300 | 8'43"±43" | 8'12" | 8'31" | | | | 9'05" | 8'44" | 8'23" |
| 13 | 100 | | 300 | 8'43"±43" | | | 8'39" | | | 8'32" | | |
| 1 | 100 | 3 | | 8'43"±43" | 9'47" | 8'28" | | | | | 8'42" | 8'39" |
| 2 | 100 | 3 | | 8'43"±43" | 10'03" | 8'21" | | 9'12" | | 8'37" | | |

* Mean and Standard Deviation of 20 rabbits.
NOTE.—Heparin: 151 U.S.P. anticoagulant units/mg.

TABLE VIII.—SYSTEMIC ANTICOAGULANT ACTIVITY AFTER INTRADUODENUM INJECTION OF HEPARIN, DIMETHYL SULFOXIDE AND STEARYL ALCOHOL

| | Material injected | | | Hours after injection | | | | | | | |
|---|---|---|---|---|---|---|---|---|---|---|---|
| | Heaprin, mg. | DMSO, ml. | Stearyl alcohol, mg. | *0 | 5 | 7 | 16-20 | 20-25 | 25-30 | 30-40 | 40-50 |
| | | | | Clotting time (min. and sec.) | | | | | | | |
| Rabbit No.: | | | | | | | | | | | |
| 14 | 100 | 3 | 300 | 8'45"±43" | 12'07" | 12'21" | | 16'14" | 16'33" | | |
| 15 | 100 | 3 | 300 | 8'45"±43" | 12'05" | | | | | | |
| 16 | 100 | 3 | 300 | 8'45"±43" | | | 15'02" | | | | |
| 17 | 100 | 3 | 300 | 8'45"±43" | | | 13'06" | 15'19" | | | |
| 18 | 100 | 3 | 300 | 8'45"±43" | | | 16'40" | 18'51" | | 18'50" | 18'43" |
| 19 | 100 | 3 | 300 | 8'45"±43" | | | 12'05" | 16'06" | | 20'44" | 15'46" |
| 20 | 100 | 3 | 300 | 8'45"±43" | | | | 12'20" | 12'48" | 15'30" | |
| 21 | 100 | 3 | 300 | 8'45"±43" | | | | 16'30" | | | 10'10" |
| 22 | | 3 | 300 | 8'45"±43" | 8'33" | | | 8'52" | | | 8'05" |
| 23 | | 3 | 300 | 8'45"±43" | | 8'30" | | | | 8'38" | 8'28" |
| 24 | 100 | | 300 | 8'45"±43" | 8'52" | | | 8'38" | 9'11" | | 8'48" |
| 25 | 100 | | 300 | 8'45"±43" | | | 8'55" | 8'40" | | | |

* Mean and Standard Deviation of 20 rabbits.

TABLE IX.—SYSTEMIC ANTICOAGULANT ACTIVITY AFTER INTRADUODENUM INJECTION OF HEPARIN, DIMETHYL SULFOXIDE, AND BEHENYL ALCOHOL

| | Material injected | | | Hours After Injection | | | | | | | | | |
|---|---|---|---|---|---|---|---|---|---|---|---|---|---|
| | Heparin, mg. | DMSO, ml. | Behenyl alcohol, mg. | *0 | 2-5 | 6-10 | 15-19 | 20-24 | 25-30 | 30-40 | 40-50 | 50-60 | 60-70 |
| | | | | Clotting time (min. and sec.) | | | | | | | | | |
| Rabbit No.: | | | | | | | | | | | | | |
| 26 | 100 | 3 | 100 | 8'45"±43" | 15'09" | | | 14'19" | | 12'40" | 18'45" | | 8'25" |
| 27 | 100 | 3 | 100 | 8'45"±43" | | 13'37" | | 12'26" | | 19'45" | | | |
| 28 | 100 | 3 | 100 | 8'45"±43" | | | 13'19" | | | | | 16'03" | |
| 29 | 100 | 3 | 200 | 8'45"±43" | 12'10" | 13'03" | | | | | | | |
| 30 | 100 | 3 | 200 | 8'45"±43" | | | 14'50" | 13'30" | | | 16'30" | | 21'30" |
| 31 | 100 | 3 | 200 | 8'43"±43" | | | | 11'45" | | | 14'30" | | 14'34" |
| 32 | | 3 | 200 | 8'45"±43" | 8'21" | 8'13" | | 8'49" | 9'02" | | | | 9'09" |
| 33 | | 3 | 200 | 8'45""±43" | | | 8'13" | | | 8'46" | 8'51" | | 8'31" |
| 34 | 100 | | 200 | 8'45"±43" | 8'31" | | | 8'56" | | | | 8'34" | |
| 35 | 100 | | 200 | 8'45"±43" | | | 9'21" | 8'33" | | | 8'38" | | |

*Mean and Standard Deviation of 20 rabbits.

TABLE X.—SYSTEMIC ANTICOAGULANT ACTIVITY AFTER INTRADUODENUM INJECTION OF HEPARIN, DIMETHYL SULFOXIDE AND ARACHIDYL ALCOHOL

| | Material Injected | | | Hours after injection | | | | | |
|---|---|---|---|---|---|---|---|---|---|
| | Heparin, mg. | DMSO, ml. | Arachidyl, alcohol mg. | 0 | 6 | 25 | 48 | 72 | 79 |
| | | | | Clotting time (min. and sec.) | | | | | |
| Rabbit No.: | | | | | | | | | |
| 36 | 100 | 3 | 200 | 8'45" | 10'30" | 15'10" | 16'03" | 14'05" | 11'34" |

TABLE XI.—SYSTEMIC ANTICOAGULANT ACTIVITY AFTER INTRA-JEJUNUM ADMINISTRATION OF HEPARAIN, Di-n-PROPYL SULFOXIDE AND OLEYL ALCOHOL

| | Heparin *, mg. | Di-n-propyl sulfoxide, ml. | Oleyl alcohol, ml. | Hours after injection | | | | |
|---|---|---|---|---|---|---|---|---|
| | | | | **0 | 1 | 3 | 5 | 6 |
| | | | | Clotting time (min. and sec.) | | | | |
| Rabbit No.: | | | | | | | | |
| 57 | 100 | 2.0 | 1.0 | 8'45"±43" | 48'02" | 24'10" | 13'51" | |
| 58 | 100 | 2.0 | 1.0 | 8'45"±43" | 53'13" | 36'42" | | 8'05" |
| 59 | 100 | 2.0 | 0.5 | 8'45"±43" | 41'21" | 17'10" | 8'45" | |
| 60 | 100 | 2.0 | 0.5 | 8'45"±43" | 46'21" | 15'12" | 8'05" | |
| 61 | 100 | 2.0 | 0.5 | 8'45"±43" | 41'30" | 13'14" | | 9'10" |
| 62 | | 2.0 | 0.5 | 8'45"±43" | 7'55" | 8'07" | 8'05" | |
| 63 | 100 | | 0.5 | 8'45"±43" | 8'43" | 8'25" | 8'02" | |
| 64 | 100 | 3.0 | | 8'45"±43" | 17'08" | 9'30" after 2½ hrs. | | |

* Heparin, 155 U.S.P. anticoagulant units/mg., di-n-propyl sulfoxide, 50% aqueous solution.
** Mean and standard deviation for 20 rabbits.

TABLE XII.—SYSTEMIC ANTICOAGULANT ACTIVITY AFTER INTRA-JEJUNAL INJECTION OF Di-n-BUTYL SULFOXIDE, SODIUM HEPARIN AND OLEYL ALCOHOL TO THE RABBIT

| | Injecta | | | Hours after injection | | | |
|---|---|---|---|---|---|---|---|
| | Sodium Heparin,* mg. | 50% DMSO, ml. | Oleyl alcohol, ml. | **0 | 1 | 2 | 5 |
| | | | | Clotting time (min. and sec.) | | | |
| Rabbit No. | | | | | | | |
| 65 | 100 | 2.0 | 1.0 | 8'45"±43" | 33'20" | 56'04" | 11'30" |
| 66 | 100 | 2.0 | 1.0 | 8'45"±43" | 29'38" | 48'13" | 9'14" |
| 67 | 100 | 2.0 | 1.0 | 8'45"±43" | 30'08" | | |
| 68 | 100 | 2.0 | 0.0 | 8'45"±43" | 16'32" | | 10'00" |

*Sodium Heparin, 159 U.S.P. Anticoagulant u./mg.
**Mean and S.D. of 20 rabbits.

Table VI shows the results of intraduodenum administration of 4 ml. DMSO and 100 mg. heparin in the rabbit and the dog. Systemic anticoagulant activity occurred as evidenced by the prolonged blood clotting time. In the rabbit, peak systemic anticoagulant activity occurred 2 hours after the injection. In the dog, systemic anticoagulant activity appeared within an hour, reaching a peak at 2½ hours after injection. The therapeutic level of heparin (twice the normal blood clotting time) could be maintained for 3½ hours. Since the average weight of the dog was 4 times that of the rabbit, the effective dosage of DMSO-heparin would appear to be independent of the body weight, insofar as these animal species are concerned. Neither heparin nor DMSO alone produced any anticoagulation.

Table VII shows that the addition of 300 mg. cetyl alcohol to heparin and DMSO prolonged the adjuvant action of DMSO. The response to the administration of an emulsion containing 3 ml. DMSO, 100 mg. heparin and 300 mg. cetyl alcohol was an increase of the blood clotting time from a normal 8 minutes 45 seconds to about 12 minutes, representing an increment of approximately 35%. This elevated level of heparin in the blood was maintained for about 6 hours. A significant effect was the apparent delay of approximately 16 hours before systemic anticoagulent activity appeared. This composition is useful in conjunction with applications giving immediate anticoagulant activity whereby the delayed action will take effect after that produced by the initial administration by other methods had decreased. Control experiments in which the dosages were 100 mg. heparin and 300 mg. cetyl alcohol or 300 mg. cetyl alcohol and 3 ml. DMSO did not produce any anticoagulation.

Table VIII shows that administration of DMSO and heparin with stearyl alcohol resulted in considerable improvement of the adjuvant action of DMSO. A small amount of heparin appeared in the blood (35% increase in blood clotting time) 5 hours after the dose was administered. Heparin accumulation to approximately therapeutic level was attained by about 20 hours. Peak anticoagulant activity, which exceeded slightly the therapeutically effective level, was obtained at about 30 hours. In general, the maintenance of essentially therapeutic level of heparin in the blood was of the duration of about 30 hours. Control experiments (rabbits 22–25) showed no change in clotting time. Stearyl alcohol alone failed to cause heparin absorption.

Table IX shows the response of the rabbits, in terms of blood clotting time, to the simultaneous administration of heparin, DMSO and behenyl alcohol. With 100 mg. behenyl alcohol, substantial increase in clotting time was observed within a few hours. This was maintained for a period of approximately 40 hours and by approximately 45 hours after administration, the blood clotting time was doubled. When the cencentration of behenyl alcohol was increased to 200 mg., the blood clotting time was doubled after 40 hours. This therapeutic level of heparin in the blood was maintained for a period of about 20 hours. Increasing the concentration of behenyl alcohol, revealed no significant advantage other than a possible extension of maintenance of therapeutic heparin levels in the blood. Control experiments, in which doses consisting of heparin and behenyl alcohol, or DMSO and behenyl alcohol were administered, demonstrated no change in the clotting time. This serves to reaffirm that the adjuvant activity was contributed by DMSO.

Table X shows that intraduodenum injection of 100 mg. heparin, in 3 ml. DMSO and 200 mg. arachidyl alcohol produced essentially therapeutically effective blood level of heparin after about 25 hours. This was maintained for a period of about 48 hours.

It will be seen from the foregoing Tables VI–X that the use of the fatty alcohols has lowered the minimum requirement of DMSO and has very substantially extended the period of anticoagulant activity.

Table XI shows the systemic anticoagulant activities of test rabbits, as measured by blood clotting time, after intrajejunal administration of heparin and di-n-propyl sulfoxide, with and without oleyl alcohol. It will be seen that oleyl alcohol substantially improved the adjuvant activity of the di-n-propyl sulfoxide. Without oleyl alcohol 3.0 ml. of 50% di-n-propyl sulfoxide with 100 mg. of heparin provided a blood clotting time of about 17 minutes after one hour and the blood clotting time was almost back to normal after 2½ hours. On the other hand, with the addition of 1.0 ml. oleyl alcohol to 100 mg. of heparin and 2.0 ml. of 50% di-n-propyl sulfoxide, the clotting time after one hour was raised to approximately 50 minutes and the maintenance of a therapeutically effective level of heparin was over three hours. The addition of a lower volume of oleyl alcohol, i.e. 0.5 ml., also substantially improved heparin absorption.

Table XII shows that the adjuvant effect of di-n-butyl sulfoxide for heparin absorption is considerably potentiated by oleyl alcohol. 100 mg. of sodium heparin with 2.0 mg. of 50% aqueous di-n-butyl sulfoxide approximately doubled the blood clotting time in one hour. Addition of 1 ml. of oleyl alcohol to the heparin and di-n-butyl sulfoxide resulted in approximately a four-fold increase in blood clotting time after the same one-hour period.

In each of the foregoing experiments, the heparin was dissolved in 0.5 ml. of water which served as a diluent to provide a more fluid composition and facilitate injection into the tract of the experimental animals. The heparin solution was incorporated with the dialkyl sulfoxide in the manner set forth in Examples 2–5.

Of the agents which act to promote the absorption of the anticoagulant activity from the heparin through the intestinal walls, the dialkyl sulfoxides with two or more carbon atoms in the alkyl groups have advantages over DMSO in that they do not evolve the characteristic garlic-like odor of DMSO and compositions containing them are much more readily encapsulated.

It is to be understood that various changes may be made in the proportions of the ingredients in the composition without departing from the spirit and scope of the invention.

I claim:

1. A therapeutic composition in enteric coated capsule form containing an intra-intestinally effective anticoagulant dosage of heparin in combination with an amount of a dialkyl sulfoxide selected from the group consisting of di-n-propyl sulfoxide and di-n-butyl sulfoxide effective to promote the absorption of anticoagulant activity of said heparin through the walls of the intestinal tract.

2. An intra-intestinally administrable anticoagulant composition comprising an enteric coated capsule containing heparin and a dialkyl sulfoxide selected from the group consisting of di-n-propyl sulfoxide and di-n-butyl sulfoxide, said heparin and dialkyl sulfoxide being present in the capsule in proportions of from about 50 to 1000 mg. of heparin, based on heparin having an activity of 100 u./mg., to about 0.5 to 10 grams of dialkyl sulfoxide.

3. The composition of claim 2 wherein there is included in said capsule a fatty alcohol of chain length $C_{14}$ to $C_{24}$ in proportions of about 0.1 to 10 grams.

4. The composition of claim 3 wherein the fatty alcohol is selected from the group consisting of cetyl alcohol, arachidyl alcohol, oleyl alcohol, stearyl alcohol, behenyl alcohol and mixtures thereof.

5. The composition of claim 2 wherein the dialkyl sulfoxide is di-n-propyl sulfoxide.

6. The composition of claim 2 wherein the dialkyl sulfoxide is di-n-butyl sulfoxide.

7. A method for the administration of heparin to mammalian animals comprising intra-intestinally administering a dosage of from about 50 to 1000 mg. of heparin, based on a heparin activity of 100 u./mg., in combination with about 0.5 to 10 grams of a dialkyl sulfoxide selected from the group consisting of di-n-propyl sulfoxide and di-n-butyl sulfoxide, in one or more enteric coated capsules, in order to thereby provide an amount of heparin sufficient to double the blood clotting time.

8. The method of claim 7 wherein the dosage additionally contains from about 0.5 to 10 grams of a fatty alcohol selected from the group consisting of cetyl alcohol, arachidyl alcohol, oleyl alcohol, stearyl alcohol, behenyl alcohol and mixtures thereof, to cause prolongation of the duration of absorption of the anticoagulant activity.

References Cited

UNITED STATES PATENTS

| | | | |
|---|---|---|---|
| 2,656,298 | 10/1953 | Loewe | 424—183 |
| 2,805,977 | 9/1957 | Robinson et al. | 424—38 |
| 2,875,130 | 2/1959 | Grass et al. | 424—38 |
| 2,976,212 | 3/1961 | Friedrich et al. | 424—183 |
| 3,062,716 | 11/1962 | Montandraud | 424—183 |
| 3,088,868 | 5/1963 | Windsor | 424—183 |
| 3,126,320 | 3/1964 | Morii et al. | 424—33 |
| 3,146,167 | 8/1964 | Lantz et al. | 424—38 |
| 3,181,996 | 5/1965 | Bianchini | 424—183 |
| 3,232,833 | 2/1966 | Riviere | 424—183 |
| 3,247,063 | 4/1966 | Pulver | 424—183 |

FOREIGN PATENTS

| | | |
|---|---|---|
| 644,613 | 3/1964 | Belgium. |

OTHER REFERENCES

Ferm: "Teratogenic Effect of Dimethyl Sulfoxide," Lancett, 1966:208–209, Jan. 22, 1966.

Rubin et al.: "Dimethyl Sulfoxide: Lens Changes in Dogs During Oral Administration," Science, 153:83–84, July 1, 1966.

Federal Register, 31(248):16403–16404, Dec. 23, 1966, "Dimethyl Sulfoxide (DMSO) Preparations, Clinical Testing and Investigational Use, FDA Statement of General Policy."

SHEP K. ROSE, Primary Examiner

U.S. Cl. X.R.

424—19, 34, 183, 337